United States Patent
Schwartz et al.

(10) Patent No.: US 6,934,713 B2
(45) Date of Patent: Aug. 23, 2005

(54) METHOD AND SYSTEM FOR PRESENTING PROGRAMS TO A USER THAT FACILITATE SELECTING PROGRAMS FROM A MULTITUDE OF PROGRAMS

(75) Inventors: Peter J. Schwartz, Fullerton, CA (US); William P. Price, Fountain Valley, CA (US)

(73) Assignee: Keen Personal Media, Inc., Irvine, CA (US)

( * ) Notice: Subject to any disclaimer, the term of this patent is extended or adjusted under 35 U.S.C. 154(b) by 236 days.

(21) Appl. No.: 09/839,974

(22) Filed: Apr. 20, 2001

(65) Prior Publication Data

US 2002/0156783 A1 Oct. 24, 2002

(51) Int. Cl.[7] ............................................. G06F 17/30
(52) U.S. Cl. .............................. 707/102; 707/3; 707/10
(58) Field of Search .................................. 707/102, 1–3, 707/10, 5; 725/59, 95, 46–47, 45, 39

(56) References Cited

U.S. PATENT DOCUMENTS

| | | | |
|---|---|---|---|
| 5,659,350 A | | 8/1997 | Hendricks et al. |
| 5,740,549 A | * | 4/1998 | Reilly et al. .................. 705/14 |
| 5,758,259 A | * | 5/1998 | Lawler ......................... 725/45 |
| 5,880,768 A | * | 3/1999 | Lemmons et al. ............. 348/1 |
| 6,041,323 A | | 3/2000 | Kubota |
| 6,070,160 A | | 5/2000 | Geary |
| 6,172,674 B1 | * | 1/2001 | Etheredge ................... 345/327 |
| 6,268,849 B1 | * | 7/2001 | Boyer et al. ................ 345/327 |
| 6,305,018 B1 | * | 10/2001 | Usui et al. .................... 725/49 |
| 6,481,011 B1 | * | 11/2002 | Lemmons ..................... 725/47 |
| 6,642,939 B1 | * | 11/2003 | Vallone et al. .............. 345/721 |

OTHER PUBLICATIONS

PCT International Search Report dated Aug. 20, 2002; PCT/US02/12143.

* cited by examiner

*Primary Examiner*—Shahid Alam
*Assistant Examiner*—Cam Y T Truong
(74) *Attorney, Agent, or Firm*—Milad G. Shara, Esq.; Knobbe, Martens, Olson & Bear

(57) ABSTRACT

An audio/video ("A/V") apparatus for selecting programs from a plurality of programs includes a memory, which receives and stores program information describing a plurality of programs through program attributes, and a source of user-defined criteria. The user-defined criteria identify preferred program attributes and non-preferred program attributes. The A/V apparatus includes further a preference module configured to sort through the program information to determine a program having program attributes that include the preferred program attributes and exclude the non-preferred program attributes.

24 Claims, 5 Drawing Sheets

METHOD AND SYSTEM FOR PRESENTING PROGRAMS TO A USER THAT FACILITATE SELECTING PROGRAMS FROM A MULTITUDE OF PROGRAMS

BACKGROUND OF THE INVENTION

1. Field of the Invention

The invention relates to a system for presenting programs to a user. More particularly, the invention relates to a system and a method for presenting programs to a user that facilitate selecting programs from a multitude of programs.

2. Description of the Related Art

A conventional system for displaying a program, e.g., a video program, includes a monitor or a television (TV) set connected to a set top box. The set top box is connected through a coaxial cable to a cable TV network or a satellite dish for "satellite TV." The TV set and the set top box are located, for example, in a user's home and receive a multitude of TV channels from a broadcast head end, wherein each TV channel has a multitude of programs during a typical day. In order to select and watch a certain program, the user controls, for example, the set top box to tune to a desired channel. The TV set receives a video signal from the set top box and displays the program of the desired channel.

A user may expand the system by connecting a video recorder to the TV set and the set top box to personalize television viewing by recording a program and watching it when it is convenient for the user. For instance, the video recorder may be a digital video recorder that includes a hard disk drive with a storage capacity of between 10 GB and 30 GB for recording of up to 30 hours of television programming. Further, the user may subscribe to and receive premium content such as subscription channels, pay-per-view services or video-on-demand services in order to watch a movie on a certain day and at a time of day for which the user has to pay a per-movie fee. The user may further personalize television viewing by subscribing to services such as ReplayTV (offered by Replay Network) and TiVo (offered by Philips).

The conventional system enables the viewer to receive a multitude of programs from which the user can select preferred programs, for example, for watching as "live" TV or for recording. Although the user may use program guides in paper or electronic format, or may "surf" through the programs, the number of program channels, potentially hundreds of program channels, make a program selection tedious and very time consuming. There is therefore a need to improve upon the prior art technique for presenting programs to a user so that the user's selection of preferred programs is facilitated.

SUMMARY OF THE INVENTION

The present invention may be regarded as method of selecting programs from a plurality of programs. The method accesses a first database that includes program information describing the plurality of programs through program attributes. The method obtains user-defined criteria identifying preferred program attributes and non-preferred program attributes and sorts through the first database to determine a program having program attributes that include the preferred program attributes and exclude the non-preferred program attributes.

The present invention may further be regarded as an audio/video ("A/V") apparatus for selecting programs from a plurality of programs. The A/V apparatus includes a memory, which receives and stores program information describing a plurality of programs through program attributes, and a source of user-defined criteria. The user-defined criteria identify preferred program attributes and non-preferred program attributes. The A/V apparatus includes further a preference module configured to sort through the program information to determine a program having program attributes that include the preferred program attributes and exclude the non-preferred program attributes.

BRIEF DESCRIPTION OF THE DRAWINGS

These and other aspects, advantages, and novel features of the invention will become apparent upon reading the following detailed description and upon reference to the accompanying drawings. In the drawings, same elements have the same reference numerals.

DETAILED DESCRIPTION OF THE PREFERRED EMBODIMENT

Figure 1:
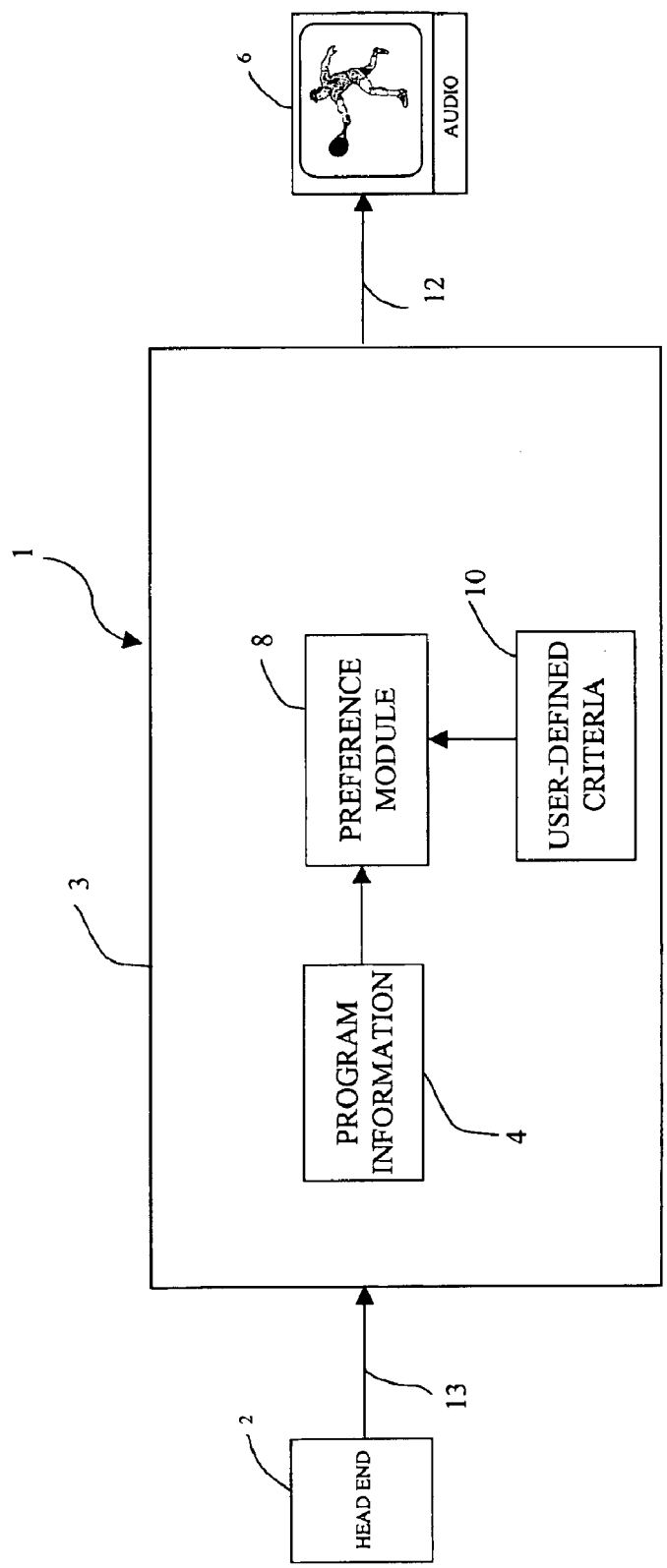
FIG. 1 shows a system for displaying video data in accordance with an embodiment of the present invention that includes an audio/video apparatus interconnected between a head end and a audio/video device, wherein the audio/video apparatus includes a preference module that sorts through stored program information, which describes a plurality of programs through program attributes, to determine a program having program attributes that include preferred program attributes and exclude non-preferred program attributes as provided by a source of user-defined criteria.

FIG. 1 illustrates an embodiment of a system 1 for presenting content (e.g., video programs, audio programs, graphics, images, text, or data content) from a content provider to a user in accordance with an embodiment of the present invention. The system 1 is configured to operate in accordance with the method of the present invention. Hereinafter, the term "program" is used to refer to the various kinds of content available from the content provider, and the term "watching" is used to refer to the user's acts of watching, listening, reading or viewing.

The system 1 includes a head end 2 and an audio/video ("A/V") apparatus 3 coupled to the head end 2 via a network 13. The head end 2 may be under control of the content provider, which may be a multiple service provider ("MSO") as known in the art. The A/V apparatus 3 is coupled via a connection 12 to an audio/display device 6 that presents selected programs to a user. The A/V apparatus 3 includes a memory 4 to receive and store program information describing programs through program attributes, a source 10 of user-defined criteria, and a preference module coupled to the memory 4 and the source 10 in order to sort through the program information as described hereinafter.

Figure 2:
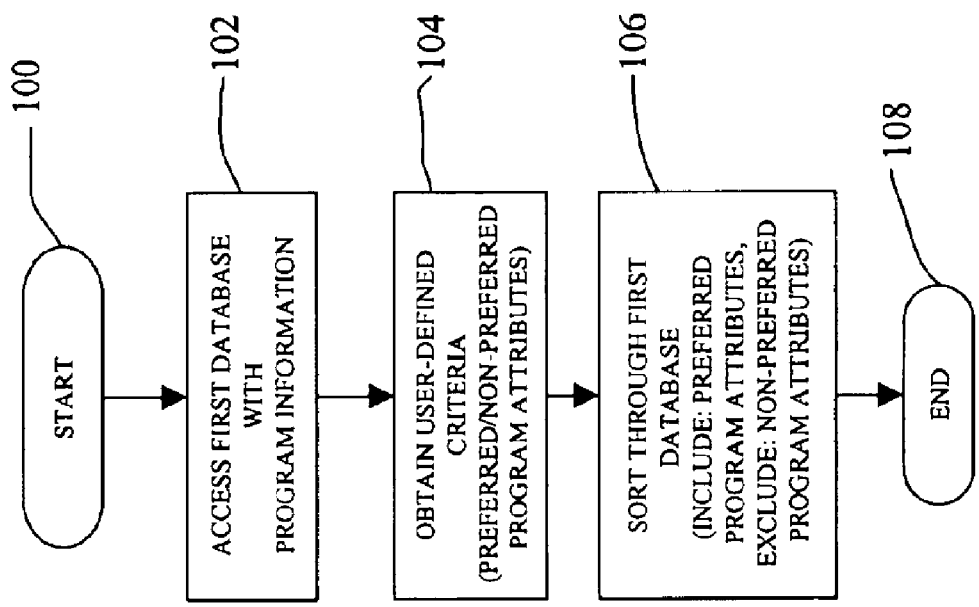
FIG. 2 is a flowchart of a procedure illustrating the method in accordance with an embodiment of the present invention that accesses a first database that includes program information describing the plurality of programs through program attributes and obtains user-defined criteria identifying preferred program attributes and non-preferred program attributes in order to sort through the first database to determine a program having program attributes that include the preferred program attributes and exclude the non-preferred program attributes.

FIG. 2 is a flowchart of a procedure illustrating the method in accordance with the present invention that selects programs from a plurality of programs to facilitate the user's selection of programs from the multitude of programs. Whenever the method is active, for example, when the A/V apparatus 3 periodically executes the procedure, when the user triggers the procedure during a viewing session, or when the user turns the audio/video device 6 on, the method generates a selection of preferred programs for presentation to the user or for selective recording. The selective recording may be automated.

In a step 100, the procedure initializes the system 1 and executes routine procedures to determine whether the system 1 is operating and properly connected. Further, the routine procedures determine if the memory 4 includes a database with the program information and if the source 10 is ready to provide the user-defined criteria.

In a step 102, the method accesses the database that includes the program information describing the plurality of programs through program attributes. The program information may be an electronic program guide received from the head end 2 and stored within the A/V apparatus 3. As known in the art, the electronic program guide lists scheduled programs for a predetermined period of time (e.g., two weeks) and provides, among others, information about broadcast dates and times and content information. For example, the program attributes include the content information, which describes for each program the channel, the actor, the director, the title, the genre, the language, the rating (critical rating and audience rating as described below), the callsign, the play content, the year of production, the multi-part format and the seasonal content. Further, the program attribute "genre" may include "Action," "Adventure," "Western," "Drama," "Thriller," "Comedy," "Musical," "Adult," "Cartoons," "Animation," etc.

Figure 4:
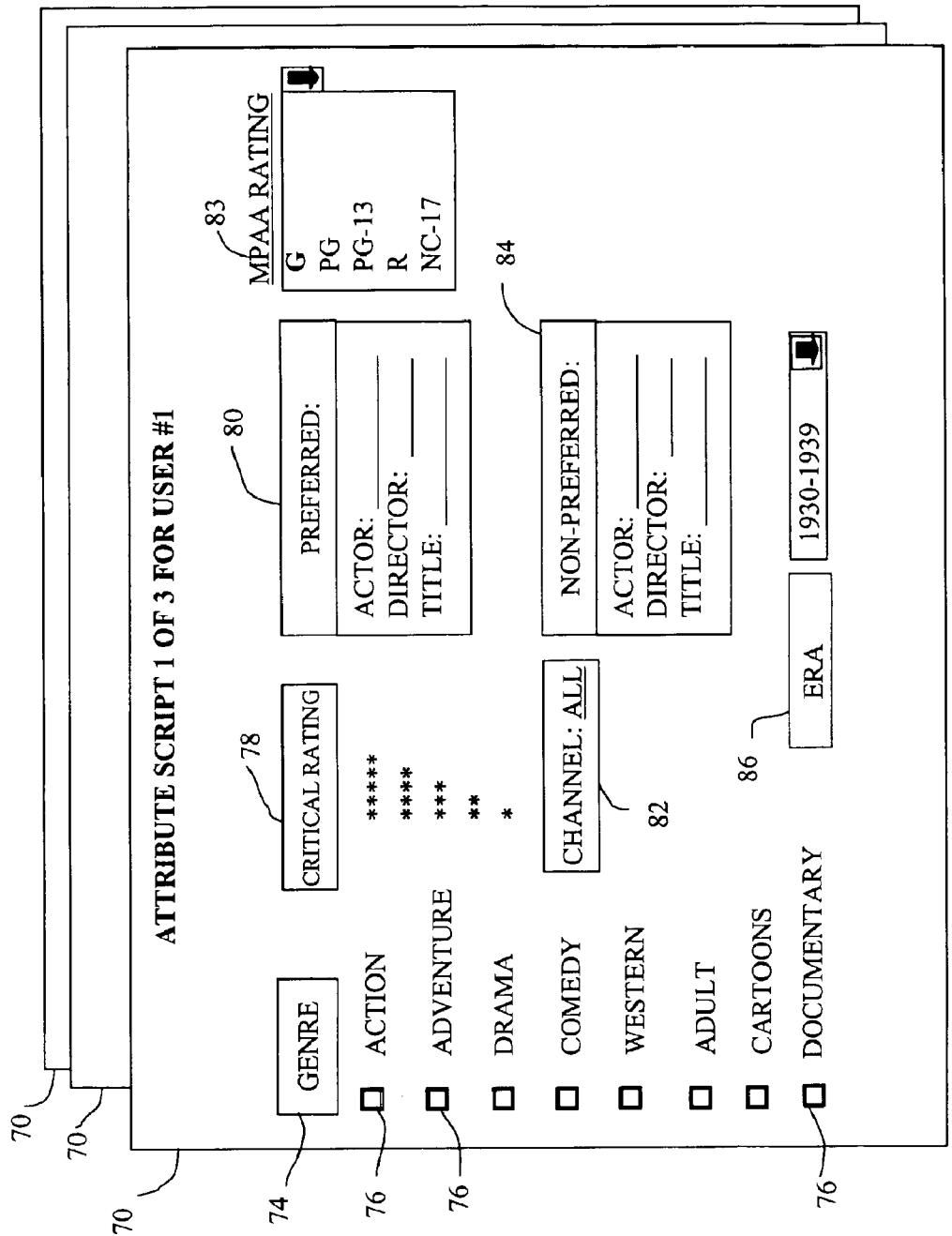
FIG. 4 illustrates an embodiment of a menu displayable on the audio/video device and permitting a user to set up an attribute script.
Figure 5:
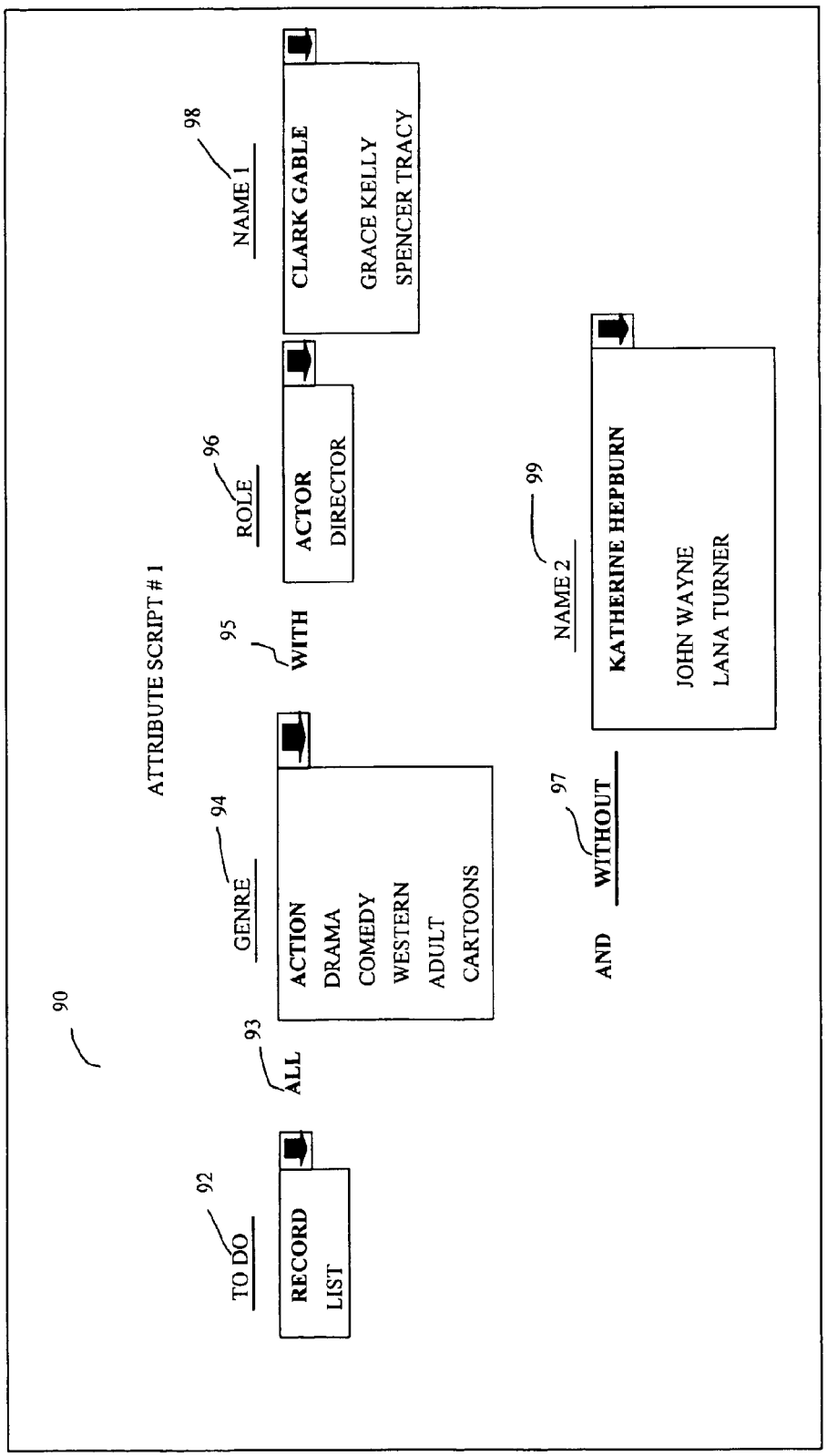
FIG. 5 illustrates a further embodiment of a menu displayable on the audio/video device and permitting a user to set up an attribute script.

In a step 104, the method obtains user-defined criteria that identify preferred program attributes and non-preferred program attributes of a user. For example, the user-defined criteria identify the user's preferred genre (e.g., Action, Adventure) and the user's non-preferred genre (e.g., Musical, Cartoons). The user-defined criteria may further identify the user's preferred actors within the preferred genre, as well as the user's non-preferred actors within the preferred genre. The user may define the user-defined criteria through a menu and an attribute script as shown in FIGS. 4 and 5.

In a step 106, the method sorts through the first database to determine a program having program attributes that include the preferred program attributes and that exclude the non-preferred program attributes. The method uses logical AND and logical NOT operations to sort through the first database, which permit the method to include programs that match the user's preferences as defined through the preferred program attributes and to exclude programs that do not match user's preferences as defined through the non-preferred program attributes. The procedure ends at a step 108.

Upon sorting through the first database, the programs determined by the procedure may be entered into a list. The list may be converted into a menu that the audio/video device 6 displays and that permits the user to select programs for watching as a "live" program or for recording for deferred watching. For example, if the user wants to watch a program, the user may "click" on the desired program and the A/V apparatus 3 and the audio/video device 6 present the desired program to the user. Likewise, if the user wants to record a program, the user "clicks" on the desired program and the A/V apparatus 3 and a video recorder (e.g., a digital video recorder shown in FIG. 3) record the desired program.

In addition to this user-initiated selection from the menu, the A/V apparatus 3 may be configured to automatically record at least one of the programs included in the menu. For example, the menu may list the selected programs in a hierarchy (e.g., the "Top 10" programs) and the A/V apparatus 3 may automatically trigger recording of the highest ranked program within the "Top 10" programs. If no time conflicts exist among the "Top 10" programs, the A/V apparatus 3 may trigger recording of one or more of the next highest ranked programs.

Figure 3:
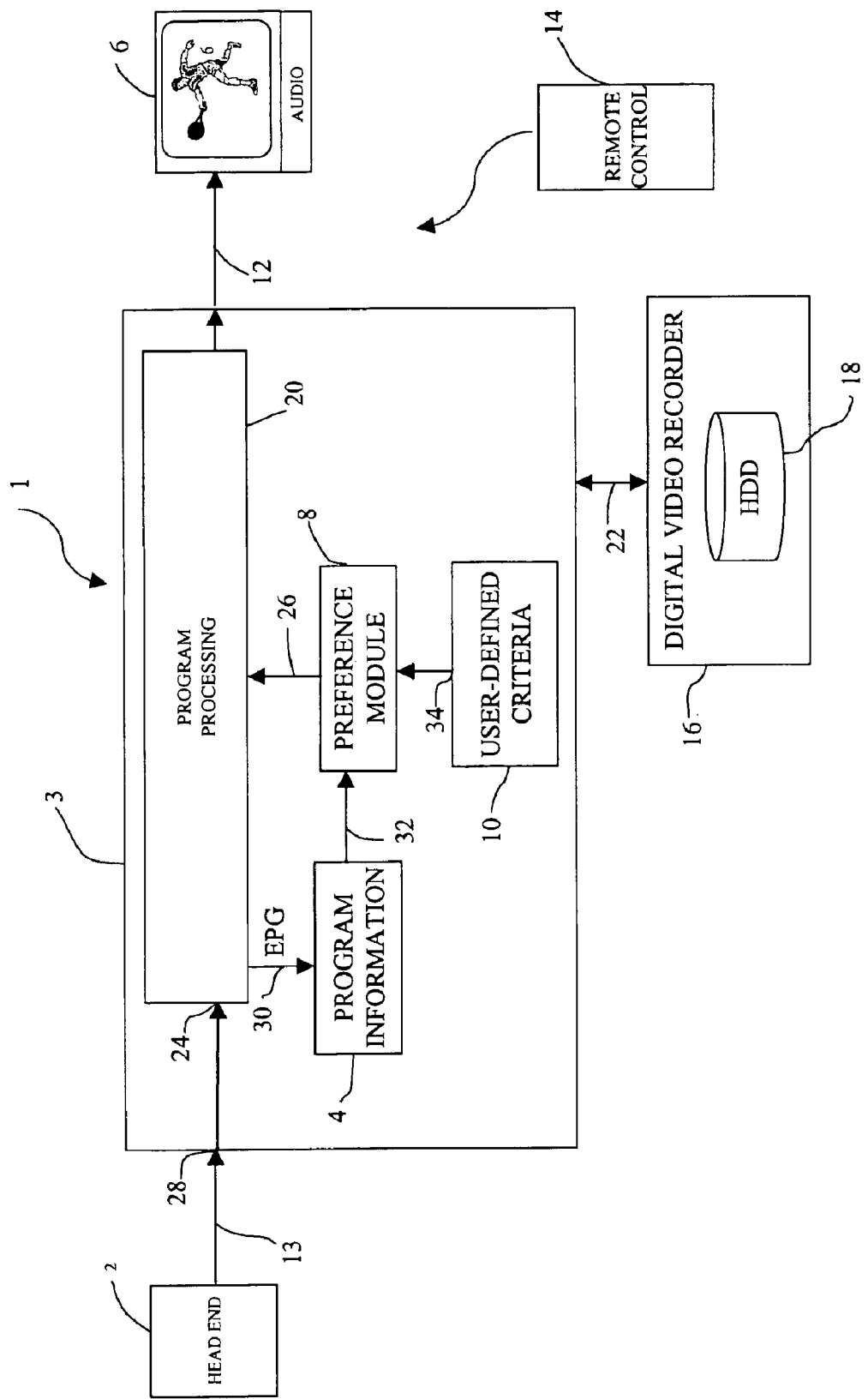
FIG. 3 shows a system for displaying video data in accordance with a further embodiment of the present invention that includes the audio/video apparatus interconnected between a head end and an audio/video device and connected to a digital video recorder.

FIG. 3 shows a system 1 for displaying video data in accordance with a further embodiment of the present invention. The system 1 of FIG. 3 is similar to the system 1 of FIG. 1 and includes the audio/video apparatus 3 interconnected between the head end 2 and an audio/video device 6. In addition, the system of FIG. 3 includes a digital video recorder 16 connected to the A/V apparatus 3 via a connection 22, and a remote control 14. The digital video recorder 16 includes a storage medium, such as a hard disk drive 18 ("HDD").

The A/V apparatus 3 includes the memory 4, the source 10, the preference module 8 and a program processing module 20. An input 24 of the program processing module 20 is connected to an input 28 of the A/V apparatus 3. The memory 4 is connected to the program processing module 20 via a connection 30. The preference module 32 is connected to the memory 4 via a connection 32, to the source 10 via a connection 34, and to the program processing module 20 via a connection 26.

In one embodiment, the A/V apparatus 3 is configured to generally perform the function of a conventional set top box. Therefore, the program processing module 20 represents for illustrative purposes the part of the A/V apparatus 3 that performs the functions of the conventional set top box. As known in the art, the functions of a set top box include, among others, tuning to a certain program channel, and processing and formatting a selected program for display on the audio/video device 6. Further details of a set top box are disclosed in copending U.S. patent application Ser. No. 09/605,623, filed on Jun. 28, 2000 and entitled "Set-Top Box Connectable To A Digital Video Recorder Via An Auxiliary Interface And Selects Between A Recorded Video Signal Received From The Digital Video Recorder And A Real-Time Video Signal To Provide Video Data Stream To A Display Device," the whole content of which is incorporated by reference herein.

In addition to the functions of a conventional set top box, the A/V apparatus 3 is configured to perform the functions in accordance with the present invention. The program processing module 20 extracts the electronic program guide ("EPG") from broadcast signals received from the head end 2, via the network 13 or via a modem (not shown), or from other sources such as the Internet, and loads the EPG into the memory 4. The stored EPG within the memory 4 may be updated periodically (e.g., daily), whenever a new version of the EPG is available (e.g., biweekly), or whenever the A/V apparatus 3 is activated.

The source 10 of user-defined criteria is in one embodiment also a memory that stores the user-defined criteria. The source 10 is associated with a user interface (not shown) which permits the user to load the user-defined criteria into the source 10. The user interface is associated with a graphical user interface and an input device. For example, the audio/video device 6 may serve as graphical user interface and the remote control 14 or a keyboard may serve as input devices.

The user may input the user-defined criteria during initial set up of the A/V apparatus 3 to define a general user profile. The user may modify the general user profile at a later time to adapt the criteria to the user's changing preferences. Also, the user may modify the general profile at the beginning of a viewing session to adapt the criteria to a present preference, for example, existing on a Saturday evening. Further, the A/V apparatus 3 permits several users, e.g., the members of a family, to define individual user profiles. Each user may further define more than one user profile, e.g., a profile for weekends and a profile for weekdays, or different profiles for different genres (e.g., an "action movie profile" or a "comedy profile").

The preference module 8 is coupled to the memory 4 and to the source 10 and has access to the data stored therein. The preference module 8 implements the procedure illustrated in FIG. 2 and is hereinafter referred to as advanced recommendation engine ("ARE"). The ARE sorts through the program information stored in the memory 4 to determine a program having program attributes that include the preferred program attributes and exclude the non-preferred program attributes as defined by a currently active user profile. The result of this sorting through the program information is presented to the user as the list.

The A/V apparatus 3 may be set up to activate the ARE automatically or upon user input. That is, the A/V apparatus 3 may activate the ARE every time the user activates the A/V apparatus 3, every time the data of the memory 4 or the source 4 changes, or periodically after predetermined interval (e.g., two hours). Further, the user may activate the ARE during a viewing session, for example, to decide whether or not to change a channel. The user may also define a current profile and activate the ARE. For example, the user may modify or override the general user profile and define the following profile:

GENRE: Action, Adventure

Preferred Actor(s): Clint Eastwood

Non-Preferred Actor(s): Sandra Locke

Era: 1970–1980

The ARE interprets this user profile as "show me all action or adventure movies with Clint Eastwood but not with Sandra Locke that were released between 1970 and 1980." Upon activation of the ARE, the ARE determines all action or adventure movies that satisfy these criteria. The ARE permits a user to define complex statements defining the user's preferences. A particular advantage is that the user may include and exclude certain criteria.

In one embodiment, the programs determined by the ARE are presented to the user as a menu from which the user may select a program for watching as a "live" program or for recording. If the user decides to record a program, the digital video recorder 16 records the selected program. The A/V apparatus 3 and the digital video recorder 16 may be set up to automatically record program determined by the ARE. Details of an exemplary digital video recorder are disclosed in copending U.S. patent application Ser. No. 09/585,249, filed on May 31, 2000 and entitled "Digital Video Recorder Connectable To An Auxiliary Interface Of A Set-Top Box That Provides Video Data Stream To A Display Device Based On Selection Between Recorded Video Signal Received From The Digital Video Recorder And A Real-Time Video Signal," the whole content of which is incorporated by reference herewith.

FIG. 4 shows an embodiment of a menu 70 displayable on the audio/video device 6 and permitting a user to set up an attribute script. The exemplary menu includes submenus for "GENRE" 74, "CRITICAL RATING" 78, "PREFERRED" 80, "NON-PREFERRED" 84, "CHANNEL" 82, "ERA" 86 and "MPAA RATING" 83. The submenu for "GENRE" 74 shows options for the genre as boxes 76 a user can check to select a particular genre (e.g., action and adventure). The submenu "CRITICAL RATING" 78 allows the user to define the minimum number of stars a movie must have to be included in the list, wherein five stars are the highest rating and indicate that the movie has received good reviews. The submenu "MPAA RATING" 83 allows the user to restrict movies by audience categories, e.g., maturity rating as suggested by the Motion Picture Association of America (MPAA). The MPAA movie rating system suggests a suitable audience for a movie using the categories "G," "PG," "PG-13," "R," "NC-17" (e.g., G indicates that all ages are admitted). The submenus "PREFERRED" 80 and "NON-PREFERRED" 84 allow the user to type in titles and the names of actors and directors. As illustrated, the user may also define the channels and the era, e.g., between 1930 and 1939.

In the illustrated embodiment, each user may set up multiple attribute scripts. For example, the user may define attribute scripts for particular days of a week or for particular seasons of year. Further, the user may set up an attribute script for particular genres such as one attribute script for adventure movies with preferred and non-preferred actors, and other attribute scripts for news and comedies.

FIG. 5 shows another embodiment of a menu 90 that includes submenus for "TO DO" 92, "GENRE" 94, "ROLE" 96, "NAME 1" 98 and "NAME 2" 99. The submenus are roll-down menus that list the available selection in this menu 90 and that are known in the art. FIG. 5 shows the user's selections in bold for illustrative purposes. For example, the submenu "GENRE" 94 lists Action, Drama, Comedy, Western, Adult, Cartoons, from which the user select the genre Action.

The submenus are connected through terms that assist a user to set up the attribute script. The ARE of the preference module 8 interprets the illustrated attribute script as "Record all action movies with Clark Gable as actor and without Katherine Hepburn as actress."

It is contemplated that the menus 70, 90 are shown for illustrative purposes as examples for graphical user interfaces. However, those skilled in the art will appreciate that the menus may be implemented in a variety of ways. The source 10 obtains the user-defined criteria through the attribute script independent from what particular graphical user interface is implemented.

The viewer controls the A/V apparatus 3, the audio/video device 6, the digital video recorder 14, or all three devices through the remote control 14. As illustrated in FIG. 3 by way of example, the remote control 14 communicates with these devices (3, 6, 16) via a wireless link that conveys control signals using infrared (IR) light. Remote controls and their various functions are generally known in the art. In particular, it is known that IR light is modulated with a specific command, e.g., channel up or down, volume up or down, select a function, and the like, and that the controlled device detects and processes the modulated IR light to execute the command in the controlled device. The remote control 14 may have an alphanumeric keyboard to permit the user to input, for example, the names of actors or the titles of moves. Alternatively, a keyboard or a PC mouse may be connectable to at least one of the devices (3, 6, 16) to serve as an input device.

Those skilled in the art will appreciate that the functionalities of the A/V apparatus 3 and the digital video recorder 16 may be integrated into one housing and that, for example, the disk 18 may have storage locations that serve as the memory 4 and the source 10.

What is claimed is:

1. A method of selecting user-preferred programs from a plurality of programs to be viewed or stored using a memory of an audio/video apparatus, the method comprising:
    obtaining a first set of user-defined criteria for identifying preferred program attributes from user input, the preferred program attributes including attributes which a program must have in order to be of interest to the user;
    obtaining a second set of user-defined criteria for identifying non-preferred program attributes from user input, the non-preferred program attributes including attributes which a program must not have in order to be of interest to the user;
    accessing a first database that includes program information describing the plurality of programs through program attributes, the plurality of programs including at least one undesirable program having at least one preferred program attribute in combination with at least one non-preferred program attribute; and
    sorting through the first database using the first set of user-defined criteria and the second set of user-defined criteria to select programs that have the preferred program attributes and that do not have the non-preferred program attributes, the at least one undesirable program excluded from the selected programs.

2. The method of claim 1, further comprising presenting the selected programs to the user for selection.

3. The method of claim 1, further comprising recording at least one of the selected programs for deferred selection by the user.

4. The method of claim 1, further comprising receiving a user input to modify the user-defined criteria.

5. The method of claim 1, wherein said sorting involves applying a logical AND and a logical NOT to the program attributes.

6. The method of claim 1, wherein the program attributes of each program comprise at least one program attribute from a group that includes channel of the program, actor of the program, director of the program, title of the program, genre of the program, language of the program, critical rating of the program, callsign of the program, play content of the program, maturity rating of the program, multi-part format of the program, and seasonal content of the program.

7. The method of claim 1, further comprising repeatedly sorting through the first database.

8. The method of claim 1, further comprising updating the program information of the first database.

9. The method of claim 8, further comprising repeatedly sorting through the first database including updated program information.

10. The method of claim 1, wherein at least one of the first set of user-defined criteria or the second set of user-defined criteria is obtained from a second database.

11. The method of claim 10, wherein the second database stores multiple sets of user-defined criteria for multiple users.

12. The method of claim 10, wherein the second database stores multiple sets of user-defined criteria for a user.

13. The method of claim 1, wherein at least one of the first set of user-defined criteria or the second set of user-defined criteria is obtained from an input device under control of the user.

14. An audio/video apparatus for selecting programs from a plurality of programs included in a database, the plurality of programs comprising at least one undesirable program having at least one preferred program attribute and having at least one non-preferred program attribute, the apparatus comprising:
    a memory to receive and to store program information describing the plurality of programs through program attributes;
    a source of user-defined criteria, wherein the user-defined criteria comprise:
    a first set of user-defined criteria which identify preferred program attributes from user input, the preferred program attributes including attributes which a program must have in order to be of interest to a user; and
    a second set of user-defined criteria which identify non-preferred program attributes from user input, the non-preferred program attributes including attributes which a program must not have in order to be of interest to the user;
    and a preference module configured to sort through the program information to select programs, the program attributes of each selected program having at least one of the preferred program attributes identified by the first set of user-defined criteria and not having any of the non-preferred program attributes identified by the second set of user-defined criteria, the at least one undesirable program excluded from the selected programs.

15. The apparatus of claim 14, further comprising a graphical user interface for presenting the selected programs to a user for further selection by the user.

16. The apparatus of claim 15, wherein the graphical user interface is configured to receive a user input to modify the user-defined criteria.

17. The apparatus of claim 15, wherein the graphical user interface is configured to receive a user input to further select at least one of the selected programs.

18. The apparatus of claim 14, further comprising a storage device configured to record at least one of the selected programs for deferred selection by a user.

19. The apparatus of claim 18, wherein the preference module is configured to further select at least one of the selected programs for automatic recording and to initiate automatic recording of the program selected by the preference module.

20. The apparatus of claim 18, wherein the preference module is configured to further select at least one of the selected programs for recording and to initiate recording of the program selected by the preference module in response to user input.

21. The apparatus of claim 14, wherein the preference module applies a logical AND and a logical NOT to the program attributes.

22. The apparatus of claim 14, wherein the program attributes of each program comprise at least one program attribute from a group including channel of the program, actor of the program, director of the program, title of the program, genre of the program, language of the program, critical rating of the program, callsign of the program, play content of the program, maturity rating of the program, multi-part format of the program, and seasonal content of the program.

23. A method of selecting programs from a plurality of programs to be viewed or stored using a memory of an audio/video apparatus, the method comprising:

obtaining a first set of user-defined criteria for identifying preferred program attributes from user input, the preferred program attributes including attributes which a program must have in order to be of interest to a user;

obtaining a second set of user-defined criteria for identifying non-preferred program attributes from user input, the non-preferred program attributes including attributes which a program must not have in order to be of interest to the user;

accessing a first database that includes program information describing the plurality of programs through program attributes, the plurality of programs comprising at least one desirable program having at least one preferred program attribute identified by the first set of user-defined criteria and not having any non-preferred program attributes identified by the second set of user-defined criteria, the plurality of programs further comprising at least one undesirable program having at least one preferred program attribute and having at least one non-preferred program attribute;

comparing the program attributes of the desirable program and the undesirable program to the preferred program attributes;

comparing the program attributes of the desirable program and the undesirable program to the non-preferred program attributes; and selecting programs from the plurality of programs, each selected program having program attributes which include at least one of the preferred program attributes identified by the first set of user-defined criteria and which do not include any of the non-preferred program attributes identified by the second set of user-defined criteria, wherein the selected programs include the desirable program and exclude the undesirable program.

24. A method of selecting programs from a plurality of programs to be viewed or stored using a memory of an audio/video apparatus, the method comprising:

obtaining a first set of user-defined criteria from user input which define at least one required program attribute corresponding to an attribute which a program must have in order that the program be of interest to the user;

obtaining a second set of user-defined criteria from user input which define at least one barred program attribute corresponding to an attribute which a program must not have in order that the program be of interest to the user;

accessing a first database that includes program information regarding the plurality of programs, each program having one or more program attributes which describe the program, the plurality of programs comprising at least one undesirable program having at least one required program attribute defined by the first set of user-defined criteria and having at least one barred program attribute defined by the second set of user-defined criteria; and identifying a selected set of programs of interest to the user, each program of the selected set of programs having the required program attribute defined by the first set of user-defined criteria and not having the barred program attribute defined by the second set of user-defined criteria, the at least one undesirable program excluded from the selected set of programs.

\* \* \* \* \*